United States Patent [19]

Christ et al.

[11] 4,293,655

[45] Oct. 6, 1981

[54] APPARATUS FOR ENSILAGING AND FERMENTING

[75] Inventors: Charles Christ, 65 rue de Paris, 72160 Connerre, France; Jean-Michel LeBeault, Villiers/Coudun; Claude Noël, Compriegne, both of France

[73] Assignee: Charles Christ, Connerre, France

[21] Appl. No.: 53,801

[22] Filed: Jul. 2, 1979

Related U.S. Application Data

[62] Division of Ser. No. 825,487, Aug. 17, 1977, Pat. No. 4,242,361.

[30] Foreign Application Priority Data

Oct. 14, 1976 [FR] France ............................ 76 30874

[51] Int. Cl.³ ............................................ C12M 1/02
[52] U.S. Cl. ...................................... 435/316; 99/472; 426/49
[58] Field of Search ................. 99/472; 435/287, 313, 435/315, 316; 422/354, 355; 426/49

[56] References Cited

U.S. PATENT DOCUMENTS

| | | | |
|---|---|---|---|
| 2,146,326 | 2/1939 | Bergius et al. | 435/316 X |
| 3,068,155 | 12/1962 | Stich | 435/316 X |
| 3,753,731 | 8/1973 | Christ | 99/472 X |
| 3,824,151 | 7/1974 | Iijima et al. | 435/314 X |
| 3,957,585 | 5/1976 | Malick | 435/316 X |
| 4,207,180 | 6/1980 | Chang | 435/316 X |

Primary Examiner—Robert J. Warden
Attorney, Agent, or Firm—Schwartz, Jeffery, Schwaab, Mack, Blumenthal & Koch

[57] ABSTRACT

An apparatus and method for ensilaging and fermenting vegetable and animal materials, in particular cabbage, which comprises recycling liquid removed from the bottom of the ensilaging container, recycling it and distributing it on top of the material being ensilaged. The device comprises means for effecting the recycle and distribution as well as means for heating and cooling the material being recycled. Additionally, means are provided for adding desired materials prior to and during the recycle.

10 Claims, 3 Drawing Figures

APPARATUS FOR ENSILAGING AND FERMENTING

This is a division of application Ser. No. 825,487, filed Aug. 17, 1977 now U.S. Pat. No. 4,242,361.

BACKGROUND OF THE INVENTION

1. Field of the Invention

The invention relates to a process and apparatus for ensilaging vegetable materials, animal materials and the like. The ensilaging comprises subjecting the vegetable or animal material to a humid atmosphere so as to promote anaerobic fermentation of carbohydrates present in the materials.

2. Description of the prior art

U.S. Patent 3,753,731 teaches a process and apparatus for fermentation in a vacuum in an airtight container. A container is disclosed having evacuation means attached to it and whose contents, when closed, are out of contact with the atmosphere.

While the process and apparatus disclosed have proved advantageous, they nevertheless suffer from the fact that the upper layer of material being fermented or ensilaged tends to dry out. This dehydration results in uneven fermentation or ensilaging which results in a product having non-uniform properties. Additionally, in such containers the rate of acidification as for example in the manufacture of sauerkraut cannot be easily controlled.

Brief Description of the Invention

It is thus an object of the invention to provide an improved method and apparatus for fermenting and ensilaging in which the above disadvantages may be overcome and in which dehydration of the material being ensilaged is avoided.

It is a further object of the invention to provide a method for ensilaging vegetable and animal materials, and in particular cabbage for the production of sauerkraut.

As used herein, the term "ensilage" refers to the conservation in a moist state of animal and vegetable materials as a result of acidification caused by anaerobic fermentation of carbohydrates present in the materials being treated.

It is a further object of the invention to provide a high yield ensilage process for forage and vegetable material in general in which climatic effects on the process are minimized and in which costs are reduced. The process further permits the recovery of industrial byproducts of animal and vegetable origin as well as their reuse.

The present invention has additionally as an object to provide a process and apparatus in which the rate of acidification can be controlled and increased, as in the case of sauerkraut production, for example. As a result of the rapid acidification possible with the invention, the material being treated does not have a chance to spoil or putrify in the course of the parisitic fermentation. The device of the invention thus comprises means for adding materials which regulate the pH of the mass treated to control its quality.

A further object of the invention is to provide an ensilaging process as well as an apparatus therefor in which the material being ensilaged is rehydrated. Preferably, the rehydration takes place with juice removed from the bottom of the container in which the ensilaging of the animal or vegetable material, which may under certain circumstances be treated with salt, takes place. When necessary, a nutrient solution or a suspension of appropriate microorganisms can be added to the juice while it is being recycled.

It is a further object of the invention to provide a device and method for heating or cooling the juice recycled from the bottom of the container. Preferably the device is outfitted with piping means through which the liquid may be heated and cooled. Heat exchange takes place preferably by contacting the recycle juice with a heat exchange fluid flowing countercurrently. The heating and cooling may be used to accelerate or retard the effects of recycling of the juice.

It is a further object of the invention to provide for improved distribution means for the recycled liquid to effectively distribute it over the material to be ensilaged. In one embodiment of the invention a porous or permeable membrane is provided for this purpose. Alternatively, a liquid distributor plate having orifices distributed over its surface may be used.

An additional object of the invention is to provide an improved method and apparatus for the fermentation of sauerkraut.

The conventional sauerkraut fermentation process occurs in three stages. During the first stage the cabbage is fermented. The fermentation is accompanied by significant production of carbon dioxide which is required for subsequent fermentation. The length of this stage depends on the temperature used. For example, it may continue for 48 hours at about 10° C. to about two weeks at 26° C. During the second or neutral stage of the process there is no apparent activity. This period may continue for anywhere from about 10 days to a month depending upon the temperature. Finally, in the third and final stage the material becomes acidified and is accompanied by the slight evolution of carbon dioxide.

It is during the third or final stage in which, in conventional devices, a superficial drying of the sauerkraut occurs. This drying results in the loss of the top 5 to 10 cm of the sauerkraut. It additionally results in impairment of the quality of the product.

It is thus an object of the invention to provide improvements in the production of sauerkraut in which the sauerkraut is rehydrated during the third and final acidification stage by the recycling of juice present within the container in which the sauerkraut is acidified.

DETAILED DESCRIPTION OF THE INVENTION

Figure 1:
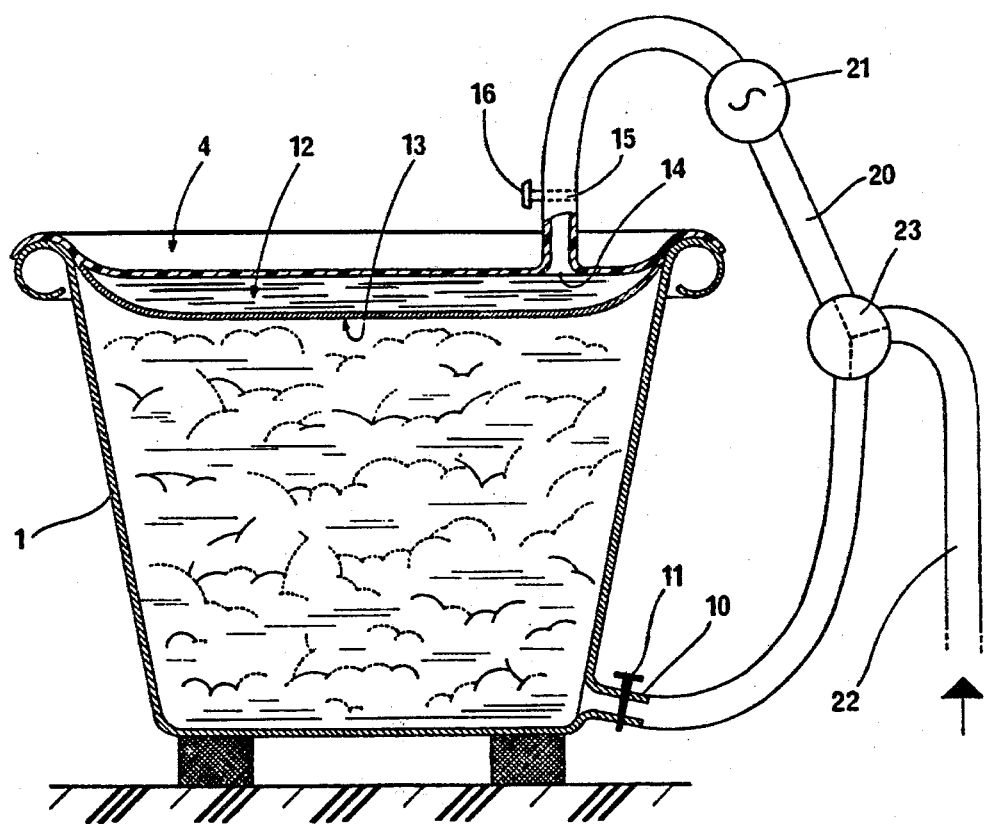
FIG. 1 illustrates an ensilaging apparatus according to the first embodiment of the invention.

FIG. 1 illustrates one embodiment of the apparatus which may be used for performing the method of the invention. As shown, a mass of cabbage in the third phase of the fermentation process is placed in a closed container 1 of the type illustrated in U.S. Pat. No. 3,753,731, the disclosure of which is herein incorporated by reference. The container is covered with a flexible top 4. Although cabbage is illustrated, the invention is by no means limited in this respect and may be used for the anaerobic fermentation of any material desired such as forage or any vegetable material. For example, hay, grass, corn, turnips, alfalfa and clover may be so treated. Additionally, food waste, agricultural waste, slaughterhouse waste, canning waste such as fish material and the like may all be treated by the illustrated apparatus.

After the container has been filled to the desired extent and capped by cover 4, it is evacuated by means of a vacuum pump. Removal of carbon dioxide is not detrimental during the acidification stage. Once evacuated, anaerobic fermentation and acidification occur. As illustrated, container 1 is provided with a piping system. By virtue of this system, liquid may be added to the top of the container 1 through feedline 20 with the aid of pump 21. Alternatively, liquid may be added by simply removing the top of the container and adding liquid into the open container.

The liquid added may be either totally fresh, recycled or a mixture of the two in any desired proportions. The added liquid serves to rehydrate the cabbage mass, thus reducing waste. It may comprise salt, sauerkraut juice and/or a nutritive solution containing for example pure yeast or a selected bacteria. Of course, the bacteria chosen will depend on the mass being treated and the results desired. When treating cabbage to make sauerkraut, salt is added to the cabbage. Additionally, materials may be added to the solution to control the pH within the container, thus stabilizing the quality of sauerkraut produced.

Recycling of the liquid may be accomplished by withdrawing liquid from the bottom of the container such as for example through an outlet 10. A valve or spigot 11 is provided for controlling the rate at which the liquid is removed. The recycled liquid is then forced up through valve 23 by pump 21 through opening 14. Liquid flow rate into the container may be controlled by a spigot 16 attached to ferrule 15.

When fresh liquid is to be added by means of pump 21, valve 23 is adjusted such that the line below the valve is closed and so that line 22 is free to feed into line 20. Line 20 is connected to a source of rehydration liquid, not shown. The rehydration liquid may comprise either water, saltwater, sauerkraut juice, a nutritive solution or a solution of yeast or bacteria, either alone or in combination and in any desired proportions. As noted previously, when treating cabbage to make sauerkraut, salt is preferably added. The salt may be added initially or in the course of the recycle.

The liquid being fed into the top of the container serves to rehydrate the mass being treated. FIG. 1 illustrates a pocket 12 which lines the flexible cover 4. While the pocket is illustrated as being adjacent to the cover, it might just as well be spaced from and independent of the cover. The bottom wall 13 of the pocket is a porous membrane.

When the rehydration liquid is fed through opening 14, it fills up pocket 12 and is then caused to diffuse through porous membrane 13 into the container. By virtue of the pocket, the rehydration liquid is thus thoroughly distributed over the upper surface of the cabbage.

It should be noted that while the apparatus illustrated in FIG. 1 uses lines 20 and 22, these need not necessarily be used in combination with the pocket 12, as for example when the rehydration liquid is directly added through the top of the container.

Furthermore, the introduction of liquid into the top of the container, which in the case of the cabbage of the example occurs during the beginning of the acidification phase, may be repeated as many times as is necessary to effect the desired result and to minimize waste of the material being treated.

Figure 2:
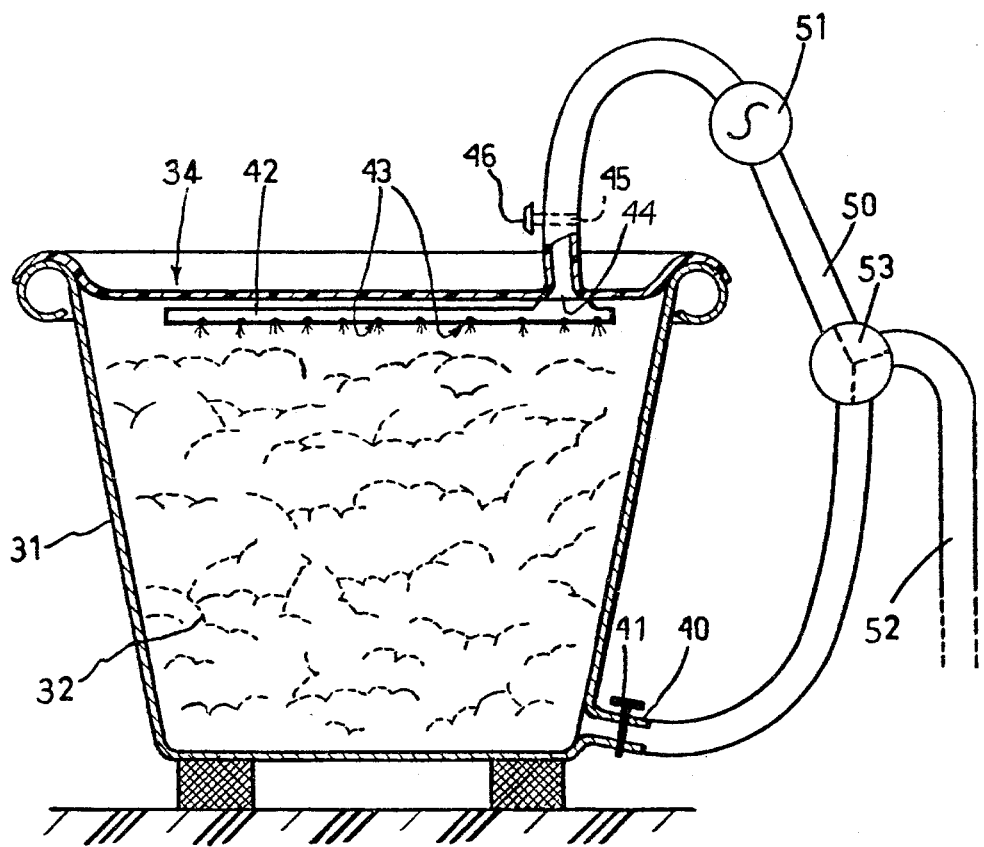
FIG. 2 illustrates an ensilaging apparatus according to a second embodiment of the invention.

FIG. 2 illustrates an apparatus similar to that of FIG. 1. A container 31 provided with a flexible top or cover 34 is filled with a mass 32 to be treated. The container is fitted with a piping system for feeding, removing and recycling liquid from the container. Liquid may again be fed initially through line 52. The flow of liquid is governed by pump 51 in conjunction with valve 53. The outlet 40 at the bottom of the container is provided with a spigot 41 and the inlet at the top of the container is provided with spigot 46 and ferrule 45. The rehydration liquid feeds through line 50 and inlet opening 44 into the distributor 42 provided with regularly spaced holes or spouts 43. Again, by adjusting valve 53, it is possible to adjust the recycle as well as to add additional materials such as a suspension of microorganisms, yeast, a nutritive solution or in the case of sauerkraut production, a salt solution.

The device of FIG. 2 is provided with a top or cover 64 and a liquid distributor for evenly distributing the rehydration liquid fed through line 80. The distributor is provided with individual delivery orifices 73 for assuring even distribution. The distributor may comprise a platelike member or a series of crossed pipes.

Although two types of distributors have been exemplified in the two preceding examples, it should be understood that any type of liquid distributor may equally be used as long as it provides an even distribution of the rehydration liquid.

As in the previous embodiment, the distributor device may be used without the recycle means illustrated.

Figure 3:
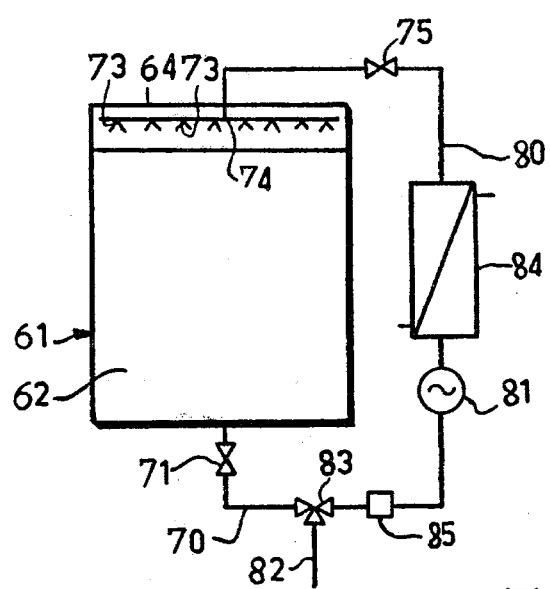
FIG. 3 is a schematic representation of an ensilaging apparatus having heat exchange means.

FIG. 3 illustrates a device similar to those illustrated in the first two examples except that provision is made for heat exchange of the recycled liquid.

In FIG. 3 a container 61 filled with a mass 62 to be treated is fitted with a piping system for feeding and recycling liquid to the container through distributor 74 through orifices 73. The liquid leaves the container through line 70, the flow being controlled by valve 71. Means 85 are provided for analyzing the content of the liquid being recycled. A heat exchanger 84 is provided for heating or cooling the liquid being circulated by the pump 81 and fed to distributor 74 through line 80 and valve 75. The heat exchanger used is preferably of the countercurrent type although cocurrent exchangers may be used. Fresh liquid may be fed to the system through line 82 controlled by valve 83.

In an embodiment not shown, the device described in FIG. 3 may be outfitted with a second heat exchanger either of the same type or different than the first, having its own recycle, feed, etc. and having its own piping system identical or similar to that shown in FIG. 3. The line leaving the heat exchanger also feeds the distributor. In such an embodiment one heat exchanger may cool while the other heats, thus making possible the addition of either cooled or heated liquid.

The drawings and specifications present a detailed disclosure of preferred embodiments of the invention. It is to be understood however that the invention is not limited to the specific devices and methods disclosed but covers instead all modifications, changes and constructions falling within the scope of the invention as it is defined by the claims.

We claim:

1. In a device for manufacturing and ensilaging sauerkraut, comprising a closable container adapted to be stored on a pallet and to receive through an upper open end of the container cabbage material to be fermented, and a flexible cover member of tightly sealing said open end of the container, the improvement comprising rehydration means for adding rehydration liquid to said cabbage material in the container, said rehydration means comprising recycling means connected to the bottom and to the upper section of said container for removing juice from the bottom of the container and recirculating said juice by introducing the removed juice into said upper section of said container, said rehydration means further comprising feeding means adapted to admix a controlled amount of a fresh rehydrating liquid with the recirculated juice prior to introducing said juice into said upper container section.

2. A device according to claim 1, wherein said rehydration means comprises a connecting conduit having one of its ends connected to said container at a location at the bottom part thereof and having its other end connected to said container at a location at the upper section thereof, said rehydration means further comprising a feeding conduit for introducing said fresh liquid into said connecting conduit and an adjustable valve connecting said feeding conduit to said connecting conduit and adapted to adjust the flow rate or recirculated juice and the flow rate of fresh liquid admixed thereto in said connecting conduit, and pump means for pumping the rehydrating liquid through said connecting conduit into said upper container section.

3. A device according to claim 2, wherein said connecting conduit comprises first valve means for adjusting the amount of juice removed from said container and second valve means for adjusting the amount of rehydration liquid introduced into said container.

4. A device according to claim 2, further comprising heat exchange means interposed in said connecting conduit for heating or cooling said rehydration liquid flowing therethrough.

5. A device according to claim 2, further comprising means for creating a vacuum inside said container.

6. A device according to claim 1, wherein distributing means are provided in the upper section of said container for evenly distributing said rehydration liquid introduced into said container over the top surface of said cabbage material.

7. A device according to claim 6, wherein said distributing means comprise a porous membrane.

8. A device according to claim 6, wherein said distributing means comprise a distribution plate provided with spouts uniformly distributed over its surface.

9. A device according to claim 1, wherein said fresh liquid is selected from the group consisting of suspensions of microorganisms or yeast, and nutritive solutions including salt solutions, and mixtures thereof.

10. A device according to claim 1, further comprising means for creating a vacuum inside said container.

* * * * *